United States Patent [19]

Hager et al.

[11] Patent Number: 5,489,481
[45] Date of Patent: Feb. 6, 1996

[54] CRYSTALLINE POLYESTERS

[75] Inventors: William G. Hager, Reynoldsburg; John D. Rinehart, Granville; James V. Gauchel; Edward L. Wilson, both of Newark, all of Ohio

[73] Assignee: Owens-Corning Fiberglas Technology, Inc., Summit, Ill.

[21] Appl. No.: 364,565

[22] Filed: Dec. 27, 1994

[51] Int. Cl.$^6$ ........................................ B32B 17/10
[52] U.S. Cl. .................... 428/431; 528/272; 525/43; 525/168; 525/445; 526/328; 526/329.2; 526/329.4; 524/601; 524/604; 523/527; 428/482
[58] Field of Search .................... 528/272; 525/43, 525/168, 437, 445; 526/328, 329.2, 329.4; 524/601, 604; 523/527; 428/431, 482

[56] References Cited

U.S. PATENT DOCUMENTS

| | | | |
|---|---|---|---|
| 3,922,247 | 11/1975 | Hazen et al. | 523/466 |
| 3,948,716 | 4/1976 | Fry | 156/324 |
| 4,230,813 | 10/1980 | Cooke et al. | 526/329 |
| 4,294,751 | 10/1981 | Garnder | 523/513 |
| 4,374,215 | 2/1983 | Atkins | 523/514 |
| 5,075,353 | 12/1991 | Hashimoto et al. | 523/209 |
| 5,089,544 | 2/1992 | Ross et al. | 523/511 |
| 5,194,334 | 3/1993 | Verdingen et al. | 428/416 |
| 5,202,366 | 4/1993 | Reid et al. | 523/516 |
| 5,256,708 | 10/1993 | Ross et al. | 523/507 |
| 5,395,863 | 3/1995 | Akiyama et al. | 523/510 |

*Primary Examiner*—Samuel A. Acquah
*Attorney, Agent, or Firm*—C. Michael Gegenheimer; Patrick P. Pacella

[57] ABSTRACT

This development provides crystalline unsaturated polyesters having unreacted olefinically unsaturated monomer entrapped within its crystal lattice. The crystalline polyester can be used in high performance, structural SMC products or as a size or binder for glass fiber reinforcements or mats.

12 Claims, No Drawings

CRYSTALLINE POLYESTERS

TECHNICAL FIELD

This development relates to crystalline polyesters. This development also relates to using these compositions for coatings for glass fibers or for molding compounds.

BACKGROUND ART

Crystalline polyesters are finding increased use as coatings for glass fibers. Industry also uses them as sheet molding compound (SMC). Crystalline polyesters function as binders for glass strands to form a mat, wet process mat, continuous strand mat and the like. They also function as a matrix resin for automotive moldings. One advantage for thermosetting solid polyesters with reactive monomers is styrene emission reduction. Further, the solid styreneated polyester has an extremely fast cure for molding.

DISCLOSURE OF INVENTION

We now have developed crystalline unsaturated polyesters with entrapped olefinically unsaturated monomer. This solid, meltable polyester thermoset has application as a glass fiber binder or matrix resin. Because styrene (or other monomers) are locked up in the crystal lattice, significantly reduced evolution of monomer relative to conventional liquid polyesters is possible. The solid nature of the material easily lends itself to being a powder coating. Carefully following the solid styreneated polyester synthesis is the key to producing the entrapped unsaturated monomer.

BEST MODE OF CARRYING OUT INVENTION

Our process produces a crystalline unsaturated polymer which contains olefinically unsaturated monomer unreacted, but entrapped, within the crystal lattice of the polymer. The polymer may be, for example, polyester, polyethylene terephthalate, polyacrylate or other thermosetting polymers. The monomer may be, for example, styrene, divinyl benzene, alpha-methyl styrene, vinyl toluene, or acrylic acid. The composition is produced by heating the crystalline unsaturated polymer to form a viscous liquid which is added to the monomer, while maintaining the temperature below 80° C. The composition is then cooled to form a solid, and then ground to a powder.

Typically, we feed molten polyester from the polyester condensation reaction into the unsaturated monomer. The molten polyester is at a temperature of 150° C. The molten polyester (at 150° C.) is let into styrene slowly at such a rate so as to not allow the temperature to exceed 80° C. The polyester, however, is kept above the polyesters fusion temperature during the addition.

The polyester in the reactor is molten and above its fusion temperature. That is, it is potentially crystalline in nature, but above the temperature at which crystallinity can be observed. When this molten polymer is placed in contact with a diluent and allowed to cool, the polyester chains begin to associate and eventually crystallize with the diluent becoming "trapped" within the crystal lattice. The result is a non-sticky, significantly reduced monomer-evolving molding compound. In principle, any diluent including monomers of all sorts, polymers, mold release agents, adhesion promoters, anti-separation additives and the like are present.

Crystalline polyesters, which contains ethylenic unsaturation that is reactable with the ethylenic unsaturation of the monomers and processes for preparing them are well known. For example, the crystalline polyester can be prepared by polyesterifying an aliphatic diol with fumaric acid, or lower alkyl esters of fumaric acid. Maleic anhydride or maleic acid or lower alkyl esters of maleic acid may also be used. Mixtures of fumaric acid or its esters, with maleic anhydride or maleic acid or its esters, also may be used. Part of the ethylenically unsaturated acid may be replaced with saturated dicarboxylic acids such as adipic, sebacic, isophthalic or terephthalic acid.

The diols are diols such as propylene glycol or depropylene glycol. Specific examples of crystalline polyesters for use in the present invention include polyfumarates of: 1,6-hexanediol; neopentyl glycol; bis-(hydroxyethyl) resorcinol; ethylene glycol; 1,4-butanediol; 1,4-cyclohexanediol; or bis-(hydroxyethyl) hydroquinone.

Examples of monomers which can be used are styrene, ring-substituted styrenes such as vinyltoluene, divinylbenzene, t-butyl styrene and chlorostyrenes, diallylphthalate, and methyl methacrylate.

As will be discussed more fully below, the resins of the present invention can be prepared conveniently from a powdered crystalline polyester or other small particle size form of the polyester.

The unsaturated polyester comprises the polycondensation reaction product of one or more dihydric alcohols and one ore more ethylenically unsaturated polycarboxylic acids. By polycarboxylic acid is generally meant the polycarboxylic or dicarboxylic acids or anhydrides, polycarboxylic or dicarboxylic acid halides, and polycarboxylic or dicarboxylic esters. Suitable unsaturated polycarboxylic acids, and the corresponding anhydrides and acid halides that contain polymerizable carbon-to-carbon double bonds may include maleic anhydride, maleic acid, and fumaric acid. A minor proportion of the unsaturated acid, up to about forty mole percent, may be replaced by dicarboxylic or polycarboxylic acid that does not contain a polymerizable carbon-to-carbon bond. Examples of which include O-phthalic, isophthalic, terephthalic, succinic, adipic, sebacic, methyl-succinic, and the like. Dihydric alcohols that are useful in preparing the polyesters include 1,2-propane diol (hereinafter referred to as propylene glycol), dipropylene glycol, diethylene glycol, 1,3-butanediol, ethylene glycol, glycerol, and the like.

The monomer component of the resinous system comprises materials that copolymerize with the unsaturated polyester. The ethylenically unsaturated monomer that is copolymerizible with the unsaturated polyester is most generally styrene, however, methyl-styrene is also useful, as are acrylates and methacrylates such as methyl-acrylates, ethylacrylate, methyl-methacrylate, ethyl methacrylate, etc.

The low-profile additive component of resinous system comprises the thermoplastic polymers which cause phase separation and porosity during the curing reaction. Low-profile additives are materials that when mixed in an unsaturated polyester and cured, result in a multi-phase system. Some polymers that are useful as low-profile additives include homopolymers and copolymers of acrylic and methacrylic acid esters, cellulose acetate butyrate, vinyl acetate homopolymers and copolymers, polyrethanes prepared from polyisocyanates, preferably diisocyanates, and polyether polyols, numerous saturated polyesters, polycaprolactone, styrenebutadiene copolymers, some modified celluloses, and certain alkyl oxide polymers. The above list of low-profile additives is not intended to list all low-profile additives but rather to show examples of materials which have been used to cause the multi-phase morphology present in low profile resins.

The acid number to which the polymerizable unsaturated polyesters are condensed generally ranges from 10 to 60. Preferably, the acid number ranges from 15 to 30. The weight average molecular weight of the unsaturated polyester ranges from 750 to 10,000 g/mole. Preferably, the weight average molecular weight ranges from 1,000 to 7,500 g/mole.

The sheet molding compound of this invention also may include other conventional materials. For example, conventional chemical thickeners may be physically mixed into the resin. The chemical thickeners generally include metal oxides, hydroxides and alkoxides of Group II, III or IV from the Periodic Table. Calcium oxide and magnesium oxide or the respective hydroxides are most often employed. In preferred embodiments, the thickener is present in amounts ranging from about 0.5 to about 6 parts, by weight.

Catalysts also may be incorporated in small amounts into the crystalline thermosetting polyester resins. Such catalysts are well known and may be similarly utilized in this invention to aid in curing the unsaturated polyester and monomer mixed with the low-profile thermoplastic polymer. Typical catalysts, for example, include organic peroxide and peracids such as tertiary butyl perbenzoate, tertiary butyl peroctoate, benzoyl peroxide and the like. The amounts of catalysts may be varied with the molding process and similarly varied with the level and types of inhibitors utilized, in a manner well known in the art. In preferred embodiments of the catalyst is present in amounts ranging from about 0.5 to about 2.5 parts, by weight, based on one hundred parts of the system.

Curing of the composition is carried out under heat and pressure typically, in closed, preferably positive pressure type molds. Mold release agents may be added to the compositions to perform their normal function, as is well understood in the art. In preferred embodiments, the mold release agents are present in amounts ranging from about 0.5 to about 6.0 parts, by weights, based on hundred parts of the four component resin system.

Fibers, fillers and pigments normally added to resin compositions can be likewise in formulating the sheet molding composition of this invention. Reinforcing fibers or fibrous reinforcement is taken to mean glass fibers in one form or another, such as glass fabrics, chopped glass strands, chopped or continuous strand glass fiber mat; however, the terms also include reinforcing agents which may also be used if desired, for example, asbestos, cotton, synthetic organic fibers and metals. Fillers, usually inert, and inorganic material useful with the compositions include, for example, clay talc, calcium carbonate, silica, calcium silicate, and the like. In preferred embodiments, the fillers are present in amounts ranging from about 165 to about 250 parts, by weight, based on one hundred part of the system.

Examples of pigments include carbon black, iron oxide, titanium dioxide, and the like, as well as organic pigments. In preferred embodiments, the pigments are present in amounts ranging from about 0 to about 4 parts, by weight, based on one hundred parts of the four component resinous system.

In one aspect of the present invention, the preparation of the sheet molding composition is generally carried out by blending together a first portion comprising the unsaturated polyester, the low-profile additive, the monomer, and such additives as a catalyst, mold release agent and fillers. This is generally known in the industry as the A-side formulation. The second portion (generally known as the B-side formulation) comprises the thickening agent and a carrier resin therefor, and such additives as pigments and mold release agents. In another aspect of the invention, an additional or secondary monomer may be is added to the B-side formulation in which the thickener is suspended. The additional monomer comprises vinyl toluene or styrene and is present in amounts ranging from about 1 to 8 parts, by weight, based on one hundred parts of the four component resinous system.

The sheet molding composition of the present invention can be prepared by mixing the components in a suitable apparatus of temperatures which are conventional and known to those skilled in the art. Once the sheet molding composition is formulated, the composition can be molded into thermoset articles having a desired shape. The actual molding cycle will, of course, depend upon the exact composition being molded. In preferred embodiments, suitable molding cycles are conducted at temperatures ranging from about 250°–350° F. for periods of time ranging from about ⅓ to about 5 minutes.

The crystalline polyesters are also employable with any glass fiber conventionally utilized for the reinforcement of polymeric resins. The term "glass fibers" as used herein shall mean filaments formed by attenuation of one or more streams of molten glass and to strands formed when such glass fiber filaments are gathered together in forming. The terms shall also mean yarns and cords formed by applying and/or twisting a multiplicity of strands together and woven and nonwoven fabrics which are formed of such glass fiber strands, yarns, or cords. Preferably, the coating formulation of the present invention is usable with conventionally available fibers.

When our polyester functions as a fiber coating, the invention comprises an aqueous coating composition comprising, approximately, on a weight percent basis:

|  | Weight percent |
| --- | --- |
| crystalline thermoplastic polyester | 5–50 |
| surfactant | 0–2 |
| fdm former polymer | 0–5 |
| a thickening agent | 0–.1 |
| water | balance |

Final solids content ranges from 2 to 50 weight percent. The coating composition is applied so as to deposit a dried coating on the fibers.

The surfactant used in the aqueous coating composition may be a conventional polyether polyol, such as, for example, an alkyl aryl polyether alcohol sold by the trade name TRITON X 100® available from the Rohm & Haas Co.

The dispersible or emulsifiable film forming polymer used in the aqueous coating composition may be a conventional elastomeric polyurethane polymer, such as, for example, RUCO 2010 L available from the RUCO Polymer Corp.

The gel or thickening agent used in the aqueous coating composition may be chosen from a wide range of conventional thickening agents. Drewfloc 270, a polyamid from Drew Chemical Co., has been found to be particularly useful in this application.

The amount of water in the aqueous coating composition is that amount necessary to give a total solids (nonaqueous) content of the aqueous coating composition sufficient to coat the fibers. It is preferred to have the total solids content in the range of about 2 to 50 weight percent, most preferably about 15 to 30 weight percent.

The following formulations are provided to illustrate examples of the compositions of the present invention.

INDUSTRIAL APPLICABILITY

Example I

We prepared a crystalline polyester with entrappeal styrene according to the following solid styreneated polyester synthesis.

| Ingredients | Amount (g) |
| --- | --- |
| Propylene glycol (PG) | 166.0 g |
| Neopentyl glycol (NPG) | 1,611.2 g |
| Maleic anhydride (MAN) | 1,725.0 g |
| Toluhydroquinone, reactor inhibitor | 0.30 g |
| Piperidine, catalyst | 2.0 mL |

Procedure

To a 4 liter reactor set up for polyester condensation, add the maleic anhydride and then the PG, IPA, THQ and NPG. Now heat the reactor to 190° C. with the nitrogen sparge set at 0.5 scfm. When the evolution of distillate slows (after about 220–225 mL), add the piperidine. Now increase the reactor temperature to 205° C. and cook to the following end points:

AV=25–28 mg KOH/g resin

ICI (175° C.)=35 poise

Timed bubble viscosity (60/40 resin/styrene)=30–34 $1/100$ minutes.

Blending with Styrene

The molten polyester (at 150° C.) is let into styrene slowly at such a rate so as to not allow the temperature to exceed 80° C.

| Ingredients | Amount (g) |
| --- | --- |
| Styrene | 1,210 g |
| Parabenzoquinone (PBQ) | 0.056 g |
| MTBHQ | 0.25 g |
| BHT | 0.25 |

We also carefully kept the temperature of the blend above the crystallization temperature of the polyester. When the blending was completed, we cooled it to form a solid and then ground the solid into a powder.

Example II

The crystalline unsaturated polyesters with entrapped styrene of Example I was prepared into SMC formulations as follows.

| Ingredient | Weight(g) | Comments |
| --- | --- | --- |
| Resin | 2,799 | Unsaturated polyester of Ex. I |
| LPA | 943 | Poly(ethylene glycol-co-propylene glycol-co-adipic acid) in styrene; |
| CBA-60(6%) | 218 | Anti-separation additive from Witco |
| Para-benzo quinone (PBQ) | 1 | |
| Tert-butyl-peroxybenzoate (TBPB) | 77 | Free radical initiator |
| Calcium stearate | 206 | Mold release agent |
| Calwhite II | 318 | Calcium carbonate filler |
| P-710 | 151 | Polypropylene oxide; low profile additive |
| E-4600 | 604 | Magnesium hydroxide pigment "B" side |

The resin was formulated into SMC and allowed to maturate for several days. Typical viscosity of the resin at molding time was 6–20 MM cps vs. typically 20–40 MM cps.

The SMC was molded at 30–40 tons (rather than standard 108 tons) and the an excellent part with good surface was obtained from a 12×18 mold.

Surface analysis revealed a Loria value ranging from 40 to 60.

A very acceptable Loria value for auto parts is a Loria of less than 80 (lower values mean smoother surface).

Example III

The crystalline polyester powder can be coated onto glass fibers as follows.

| | Weight percent |
| --- | --- |
| crystalline thermoplastic powder of Example I | 25 |
| Alkylaryl polyether alcohol surfactant TRITON X100 from Rohm & Haas | 0.89 |
| Polyurethane latex film forming polymer RUCO 2010 L from RUCO Polymer Corp. | 2.0 |
| Poly acrylamide thickening agent, Drewfloc 270 from Drew Chemical Co. | .048 |
| Water | balance |

Final solids content was about 27 weight percent. The coating composition is applied onto a conventional glass fiber from Owens-Corning Fiberglas Corporation so as to deposit a dried coating on the fibers corresponding to about 26 weight percent of the weight of the fibers (LOI).

Heating the coated fibers to about 150° C. causes the adhered crystalline polyester powder to flow and fuse, thereby producing a fiber reinforced product. The coated, cured fiber reinforced product when overwrapped on a cable provides a cable having the necessary flexibility and proper degree of stiffness for subsequent processing.

We claim:

1. A composition, comprising:

a crystalline unsaturated polyester having a crystal lattice comprising a polycondensation product of one or more polyhydric alcohols and one or more ethylenically unsaturated polycarboxylic acids; and an unreacted olefinically unsaturated monomer entrapped within the crystal lattice of the polyester.

2. A composition, comprising:

a crystalline unsaturated polyester having a crystal lattice comprising a polycondensation product propylene glycol, neopentyl glycol and maleic arthydride; and unreacted styrene entrappeal within the crystal lattice of the polyester.

3. Sheet molding compound composition including the composition of claim 1.

4. Sheet molding compound composition including the composition of claim 2.

5. The composition of claim 3 including one or more low-profile thermoplastic additives.

6. The composition of claim 4 including one or more low-profile thermoplastic additives.

7. An aqueous coating or binder composition comprising, on a weight percent basis:

|  | Weight percent |
| --- | --- |
| crystalline thermoplastic polyester of claim 1 | 5–50 |
| surfactant | 0–2 |
| film former polymer | 0–5 |
| a thickening agent | 0–0.1 |
| water |  |

8. An aqueous coating or binder composition comprising, on a weight percent basis:

|  | Weight percent |
| --- | --- |
| crystalline thermoplastic polyester of claim 2 | 5–50 |
| surfactant | 0–2.0 |
| film former polymer | 0–5 |
| a thickening agent | 0–0.1 |
| water | balance |

9. A plurality of flexible filaments at least a portion of the filament's surface being coated with a residue produced by evaporating water from the aqueous coating composition of claim 7.

10. A filament according to claim 9 wherein the filament is made of glass.

11. A plurality of flexible filaments at least a portion of the filament's surface being coated with a residue produced by evaporating water from the aqueous coating composition of claim 8.

12. A filament according to claim 11 wherein the filament is made of glass.

* * * * *

UNITED STATES PATENT AND TRADEMARK OFFICE
CERTIFICATE OF CORRECTION

PATENT NO. : 5,489,481
DATED : February 6, 1996
INVENTOR(S) : Hager et al

It is certified that error appears in the above-identified patent and that said Letters Patent is hereby corrected as shown below:

In column 1, line 66, "oft he" should be --of the--.

In column 2, line 26, "ore" should be --or--.

In column 4, line 38, "fdm" should be --film--.
Column 6,
In claim 2, line 61, "arthydride" should be --anhydride--.

In claim 2, line 62, "entrappeal" should be --entrapped--.
Column 7,
In claim 7, line 9, the word --balance-- needs to be inserted opposite "water" in the weight percent column.

Signed and Sealed this

Sixth Day of August, 1996

Attest:

BRUCE LEHMAN

Attesting Officer

Commissioner of Patents and Trademarks